United States Patent Office 2,801,981
Patented Aug. 6, 1957

2,801,981
POLYMERIZED TERTIARY ALKYLATED ALLYL PHENOLS AND RUBBER COMPOSITIONS

Ronald B. Spacht, Franklin Township, Portage County, Ohio, assignor to The Goodyear Tire & Rubber Company, Akron, Ohio, a corporation of Ohio No Drawing. Application March 18, 1955,
Serial No. 495,342

12 Claims. (Cl. 260—4)

This invention relates to the preservation of rubber, and more particularly to the provision and use of a new class of phenolic age resistors for rubber.

Rubber is subject to deterioration for many sources, such as sunlight, ozone, atmospheric oxygen, presence of heavy metals, etc. Both cured and uncured natural and synthetic elastomers are subject to deterioration. Deterioration in cured stock may likewise vary with the type of stock, the state of cure, the amount of surface exposed and the temperature at which the rubber is being used. An ideal antioxidant would be one which would protect rubber from deterioration regardless of kind, in the cured or uncured state, no matter where used. Since no such antioxidant has been discovered, compromises must be made in the selection of an antioxidant for use in rubber.

The effectiveness of a phenolic antioxidant will vary with the degree of alkylation, the type of alkyl groups present and the location of the substituent alkyl groups. Furthermore, the vapor pressure of the phenolic molecule is of particular importance for certain uses, i. e., for high temperature uses and for uses wherein large rubber surfaces are exposed. Again compromises may have to be made; for example, a good antioxidant may be too volatile for general usage while, on the other hand, a nonvolatile material may be a poor antioxidant.

According to the present invention, a class of phenolic resins have been discovered which exhibit unusual and unexpected antioxidant activity, and which are relatively nonvolatile. They exhibit a high degree of protection for rubber against sunchecking and against atmospheric oxygen. Furthermore, they are derived from cheap raw materials and hence possess an economic advantage over most antioxidants of this general class.

In the practice of this invention, alkenyl phenolic resins are prepared according to the teachings of application Serial Number 349,538 filed April 17, 1953, so that the resinous composition always has all positions ortho and para to the hydroxyl groups of the phenolic substituents occupied by hydrocarbon radicals, at least one of said positions being filled with a tertiary hydrocarbon radical having at least four carbon atoms but not over nine carbon atoms. The tertiary hydrocarbon radical may be placed on the phenolic ring either before reaction with the alkenyl composition or after said reaction. Preferably, the polymerization reactant is prepared in such manner that at least one ortho or para position is always open and is thereafter polymerized to obtain a resin which is made up of phenolic molecular chains in which each phenolic unit has at least one ortho or para position available for substitution. After the polymerization product has been thus prepared, it is reacted with a tertiary olefin having at least four carbon atoms but not over nine carbon atoms in order to alkylate the available positions with a tertiary radical.

These polymerizable compositions can be represented by the following structural formula:

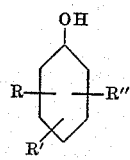

wherein R is a tertiary hydrocarbon radical having at least four carbon atoms but not over nine carbon atoms, R' is an alkyl hydrocarbon radical having at least one but not over three carbon atoms, R'' is selected from the group consisting of allyl and aliphatic hydrocarbon-substituted allyl radicals, all of the positions ortho and para to the hydroxyl radical being substituted with radicals selected from the group consisting of R, R' and R''.

In the practice of this invention new resinous compositions are obtained by polymerizing, in the presence of a polymerization catalyst, a phenolic compound having a primary alkenyl side chain. In particular, the invention contemplates the use of allyl phenolic compounds, including substituted primary allyl phenolic compounds.

The primary alkenyl phenolic compounds from which the useful products of the invention are prepared can be represented by the following structural formula:

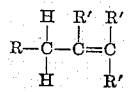

wherein R is an aromatic radical having at least one hydroxyl group directly attached thereto and R' is hydrogen or an aliphatic radical. An example is resinous allyl paracresol prepared from allyl chloride and paracresol which may be represented by the formula

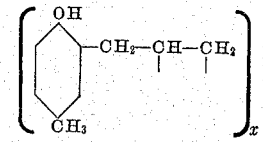

Any mono, di or polyhydric aromatic compound can be employed with any primary alkenyl compound. It is apparent that the aromatic compound and the primary alkenyl compound should be free from additional reactive substituents which would result in competing or complicating reactions. In the practice of the invention, it is preferable to have a cresyl radical connected to a hydrocarbon radical which has unsaturation between the second and third carbons from the ring.

Examples of suitable primary alkenyl phenolic compounds are:
2-allyl phenol
6-allyl,2-methyl phenol
2-allyl,3-methyl phenol
6-allyl,3-methyl phenol
2-allyl,4-methyl phenol
2-allyl,4-ethyl phenol
6-allyl,2-isopropyl phenol
2-allyl,4-isopropyl phenol
2-allyl,1-naphthol
1-allyl,2-naphthol
3-allyl,1,2-dihydroxy phenol
2-allyl,1,3-dihydroxy phenol
2-allyl,1,4-dihydroxy phenol Any of the above compounds may be substituted on the double bond carbon atoms if the substitution is of such a nature as not to interfere with the basic polymerization reaction.

The primary alkenyl phenolic compounds may be prepared in any convenient manner. A phenolic compound can be reacted with a primary alkenyl compound to produce a primary alkenyl phenolic compound. This reaction is generally accompanied by the splitting out of a simple molecule. Because a hydrogen halide is desirable as a catalyst for polymerization of a primary alkenyl phenolic composition, it is preferred that the substituted allyl reactant have a halogen atom beta to the double bond so that a hydrogen halide is split off when the reaction takes place. For example, the following structural equation,

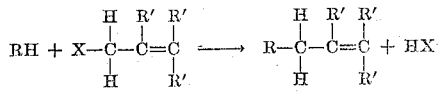

wherein R is an aromatic compound having at least one hydroxyl group directly attached to a ring, R' is a hydrogen or an aliphatic radical and X is a halogen, shows the condensation reaction. Because a hydrogen halide is thus provided by the reaction, the addition of certain metal halide polymerization catalysts completes the preferred polymerization system.

The resinous products of the invention are prepared by polymerizing the primary alkenyl phenolic compounds.

When the resin is to be used in rubber, it is desirable that the resin be readily soluble in rubber and it is therefore preferable to keep the average length of the polymer chains of the resin not over 10 monomer units. Low molecular weight polymers can be provided by regulating the conditions of reaction. For example, superior products result if the reaction temperature is kept below 125° C. and the reaction allowed to continue for several hours. The time and temperature are of course largely determined by the reactants being used and the composition desired. The antioxidant compositions of this invention are prepared by reacting together in the presence of a catalyst, e. g. an acidic polymerization catalyst, (1) a phenol, (2) an alkenyl compound such as an allyl compound and (3) a tertiary olefin having at least 4 carbon atoms but not over 9 carbon atoms. In the preferred practice, one mol of phenol is reacted with one mol of alkenyl compound and from 0.5 to 1.5 mols of the tertiary olefin.

In a preferred process, mixed cresols are reacted with an allyl halide, e. g. allyl chloride, to produce the polymerization reactant, allyl cresol. Generally, an excess of cresol is used in order to provide a solvent medium for the reaction. However, only one allyl radical will attach to a phenolic ring. Other solvents, such as benzene and toluene, can be used to keep the system fluid. This reaction provides by-product hydrogen halide, which serves as an element of the polymerization system. The addition of a catalytic amount of a metallic halide salt completes the preferred reaction and polymerization system.

The hydrogen halides useful in practicing the invention are a class of acidic compounds comprising hydrogen in combination with various halogen radicals. In effecting polymerization, these may be added in the anhydrous form or they may be generated from suitable reactants within the polymerization system. Examples of suitable hydrogen halides are HCl, HF, HBr and HI, HCl being preferred. Although it is preferred that the hydrogen halide be present in substantially anhydrous form, a small amount of water does not adversely affect the polymerization reaction. A catalytic amount of hydrogen halide is sufficient to cause the polymerization reaction. For example 0.1% based on the weight of the phenolic composition can be used. However, the reaction mixture may be saturated with hydrogen halide without affecting the reaction. Thus, when the hydrogen halide is derived from the reaction system as a by-product, more than a catalytic amount would be present. Suitable examples of polymerization catalysts which can be used are zinc chloride, stannous chloride, stannic chloride, aluminum chloride, ferrous chloride, ferric chloride, and the corresponding fluorides, bromides and iodides. The catalysts can be present in catalytic amounts, e. g. as low as 0.1% based on the weight of the phenolic composition. However, a larger amount is not harmful to the system. The amount of catalyst will customarily be kept below 5%. Usually the amount used will range from 0.1% to 1.0% based on the weight of the phenolic compound.

Although the preferred practice of the invention contemplates the use of both a hydrogen halide catalyst and a metal halide polymerization catalyst, certain acidic catalysts can activate the polymerization. For example, alkane sulfonic acids, concentrated sulfuric acid, boron trifluoride etherate, chlorosulfonic acid, ferric chloride, and aluminum chloride have been shown to catalyze the polymerization reaction when used by themselves. In combination with a hydrogen halide, the halogen salts of zinc, tin, iron, aluminum, antimony, nickel, and magnesium, and the sulfates thereof, are useful in catalyzing the polymerization. The halides and sulfates of copper, iron and zinc are particularly effective when used in combination with a hydrogen halide. A more rapid reaction occurs when a combination of hydrogen halide and metal salt is used in the polymerization system.

Although the preferred phenolic composition is a mixture of cresols, it is readily apparent that the individual cresols, phenol, and such double ring monohydric compounds as the naphthols are suitable for the practice of the invention. Also, dihydric phenols such as catechol, resorcinol and hydroquinone as well as polyhydric phenols such as phloroglucinol and pyrogallol can be used as the phenolic reactant. It is essential that the phenolic compound have at least one ortho or para position to the hydroxyl group open on the ring.

In the preferred practice of the invention, after the alkenyl phenolic resins have been prepared in such a manner as to always provide a reactive hydrogen ortho or para to the hydroxyl radical of each phenolic unit, the resin is treated with a tertiary olefin having at least four carbon atoms but not over nine carbon atoms in the presence of at least one of the indicated catalysts. The preferred alkenyl phenolic resins are the polymerized allyl phenols with one hydrocarbon radical having at least one but not over three carbon atoms attached to the phenolic ring in one of the positions ortho or para to the hydroxyl. The preferred tertiary olefins are isobutylene, tertiary amylene, diisobutylene, and tertiary nonene, isobutylene being preferred.

The alkylation of the resin customarily takes place at a temperature of about 25° C. to 125° C. and is normally completed in about 30–120 minutes. This alkylation process will vary considerably with the composition of the resin and the type of olefins being used. The preferred products of the invention are prepared by reacting paracresol with an allyl halide in the presence of an acidic catalyst and thereafter polymerizing the product of the reaction in the presence of a polymerization catalyst and treating the product of polymerization with isobutylene.

The invention can be illustrated by the reaction of allyl paracresol and isbutylene to yield a tertiary butyl allyl cresol resin in accordance with the equation

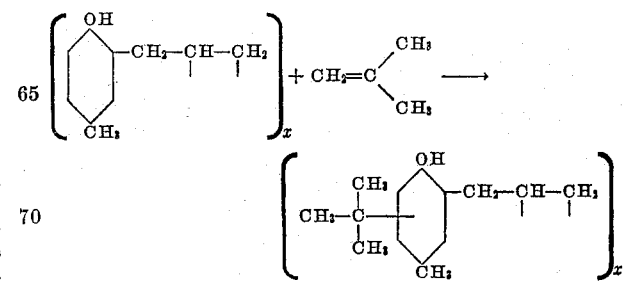

The invention is further illustrated by the following examples which are not intended as limitations:

EXAMPLE 1

One hundred grams of allyl cresol were prepared by reacting mixed cresols and allyl chloride. The allyl-mixed cresols polymerized reactant was dissolved in 150 milliliters of benzene and 5.0 grams of concentrated sulfuric acid were added as a catalyst. Thereafter, isobutylene was passed slowly into the mixture until no more isobutylene was absorbed. During this addition, the temperature was maintained between 50° C. and 60° C. Thereafter, the excess sulfuric acid was destroyed by neutralizing the same with $Na_2CO_3$ and the excess benzene was removed by distillation. One hundred thirty-four grams of tertiary butylated allyl cresol resin was obtained.

EXAMPLE 2

Sixty grams of allyl paracresol resin were prepared by reacting paracresol and allyl chloride in the presence of 1.0 gram of zinc chloride. After the reaction and polymerization were completed, the resin was dissolved in 200 milliliters of toluene and 2 milliliters of concentrated sulfuric acid were added as a further catalyst. Thereafter isobutylene was slowly added until no more was absorbed during which time the temperature was maintained between 60 and 70° C. The catalyst was then destroyed by neutralization and the excess toluene removed by distillation, yielding 78.0 grams of tertiary butylated allyl paracresol resin.

EXAMPLE 3

Eighty-three grams of tertiary butyl paracresol and 1.0 gram of $ZnCl_2$ were heated to 90° C. One hundred grams of allyl chloride (considerable excess) were added slowly over a period of 7 hours. As the reaction proceeded it was necessary to add a little $C_6H_6$ from time to time to keep the reaction mixture fluid. After the reaction was completed the catalyst was destroyed with $Na_2CO_3$ and the volatiles removed by heating under vacuo. A residue of 104.5 grams remained.

EXAMPLE 4

One hundred forty-eight grams of a resin prepared by reacting o-cresol with allyl chloride were dissolved in 200 milliliters of $C_6H_6$. Five grams of concentrated $H_2SO_4$ were added and isobutylene was passed into the mixture at 70° C. until no more would react. The catalyst was destroyed and removed. The mixture was then heated under vacuo to remove volatiles, yielding 152 grams.

EXAMPLE 5

Eight hundred eighty-eight grams of a resin prepared from para-cresol and allyl chloride were dissolved in 900 milliliters of toluene. Twenty-four grams of concentrated $H_2SO_4$ were added and the mixture heated to 85° C. Isobutylene was added until no more was absorbed. The catalyst was then destroyed with $Na_2CO_3$ and removed by filtration. The filtrate was heated to a pot temperature of 200° C. at 20 mm. to remove volatiles. One thousand ninety-two grams of butylated resin were obtained.

The products of this invention have been tested in the following standard rubber formulation:

| | |
|---|---|
| Extracted pale crepe | 100 |
| Zinc oxide | 5 |
| Sulfur | 3 |
| Hexamethylenetetramine | 1 |
| Stearic acid | 1.5 |
| Antioxidant | 1.0 |

Antioxidant efficiency was measured by aging for 18 days in an oxygen bomb at a temperature of 50° C. and under a pressure of 150 pounds per square inch. The percent of tensile retention and weight increase were used as measures of efficiency as shown in the following table:

Table I

| | 50 minutes cure at 285° F. | |
|---|---|---|
| | Percent Tensile Retention— 18 days | Percent Weight Increase— 18 days |
| Control—No Antioxidant | 0 | 18.6 |
| Butylated allyl-mixed cresol resin | 100.0 | 0.29 |
| Butylated allyl-p-cresol resin | 102.7 | 0.12 |
| Butylated allyl-o-cresol resin | 64.1 | 0.80 |

The products of the invention are useful as age resistors in both vulcanized and raw rubber and both uses are contemplated within the scope of the specification and claims.

Use of the term "a rubber" is intended to include natural rubber and the various synthetic rubbers and rubber-like materials which are similar from the standpoint of aging, e. g. polychloroprene, the polymerization products of a major proportion of a mono-olefin, such as isobutylene, and a minor proportion of a polyolefin, such as butadiene or isoprene, the rubbery copolymers of butadiene and styrene, and the rubbery copolymers of butadiene and acrylonitrile, and the like.

The term "phenolic compounds" is used herein to include any aromatic compound which contains at least one hydroxyl group directly attached to the aromatic nucleus and which does not contain reactive groups. Representative examples are phenol, the cresols, the xylenols, the ethyl phenols, the normal propyl phenols, the isopropyl phenols, the chlorophenols, the nitrophenols, the thymols, the carvacrols, and multiple ring compounds such as the naphthols. Also, dihydric phenols such as catechol, resorcinol, and hydroquinone are included. Polyhydric phenols such as phloroglucinol and pyrogallol are within the scope of the invention.

Although this invention has been described with particular reference to pure phenolic compounds, mixtures of the various phenolic materials are contemplated within the scope of the invention as indicated by the structural formulae. For example, a rubber may be treated with ae least one or more than one of the pure resinous polymerization products of a tertiary alkylated primary alkenyl phenol or it may be treated with the resinous polymerization products of a mixture of tertiary alkylated primary alkenyl phenols.

The term "primary alkenyl" is intended to include any univalent aliphatic radical containing a double bond which has two hydrogen atoms attached to the carbon atom linking the alkenyl side chain to the phenolic ring.

While certain representative embodiments and details have been shown for the purpose of illustrating the invention, it will be apparent to those skilled in this art that various changes and modifications may be made therein without departing from the spirit or scope of the invention.

I claim:

1. As a new composition of matter, the resinous polymerization product of an allyl phenol wherein the polymers have an average chain length of not over 10 monomer units and wherein all positions ortho and para to the hydroxyl radicals of the phenolic ring filled with alkyl hydrocarbon radicals, at least one of said positions being filled with a tertiary hydrocarbon radical having at least 4 carbon atoms but not over 9 carbon atoms.

2. As a new composition of matter, the resinous polymerization product of an allyl phenol wherein the polymers have an average chain length of not over 10 monomer units and wherein all positions ortho and para to the hydroxyl radical of the phenolic ring filled with alkyl hydrocarbon radicals, at least one of said positions being filled with a tertiary hydrocarbon radical selected from the group consisting of tertiary butyl, tertiary amyl, tertiary hexyl, tertiary heptyl, tertiary octyl, and tertiary nonyl.

3. As a new composition of matter, the polymerized product of

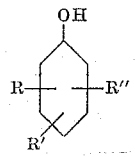

wherein the polymers have an average chain length of not over 10 monomer units and wherein R is a tertiary hydrocarbon radical having at least 4 carbon atoms but not over 9 carbon atoms, R' is an alkyl hydrocarbon radical having at least 1 but not over 3 carbon atoms, R" is selected from the group consisting of allyl and aliphatic hydrocarbon-substituted allyl radicals, one of the positions ortho and para to the hydroxyl radical being filled with R", one of the positions ortho and para to the hydroxyl being filled with R, the remaining ortho and para positions being filled with a radical selected from the group consisting of R and R'.

4. As a new composition of matter the resinous polymerization product of 2-allyl-4-methyl-6-tertiarybutyl phenol wherein the polymers have an average chain length of not over 10 monomer units.

5. The process of preparing an antioxidant composition comprising reacting together at a temperature between 25° C. and 125° C. in the presence of from 0.5 to 5.0% by weight of an acidic polymerization catalyst (1) one mole of a phenol, (2) one mol of an allyl halide and (3) 0.5 to 1.5 mols of a tertiary olefin having at least 4 carbon atoms but not over 9 carbon atoms.

6. A process of preparing an antioxidant composition comprising the steps of reacting together at a temperature between 25° C. and 125° C. one mol of a phenol having not over one ring position filled with an alkyl radical having at least 1 carbon atom but not over 3 carbon atoms with one mol of an allyl halide in the presence of an acidic catalyst, polymerizing the product of the reaction in the presence of from 0.5 to 5.0% by weight of an acidic polymerization catalyst and treating the product of polymerization with from 0.5 to 1.5 mols of a tertiary olefin having at least 4 carbon atoms but not over 9 carbon atoms.

7. A process of preparing an antioxidant composition comprising the steps of reacting together at a temperature between 25° C. and 125° C. one mol of a phenol having not over one ring position filled with an alkyl radical having at least 1 carbon atom but not over 3 carbon atoms with one mol of an allyl halide in the presence of an acidic catalyst, polymerizing the product of the reaction in the presence of from 0.5 to 5.0% by weight of an acidic polymerization catalyst and treating the product of polymerization with from 0.5 to 1.5 mols of a tertiary olefin selected from the group consisting of isobutene, tertiary pentene, tertiary hexene, tertiary heptene, tertiary octene and tertiary nonene.

8. A process of preparing an antioxidant composition comprising the steps of reacting together at a temperature between 25° C. and 125° C. one mol of a phenol having not over one ring position filled with an alkyl radical having at least 1 carbon atom but not over 3 carbon atoms with one mol of an allyl halide in the presence of an acidic catalyst, polymerizing the product of the reaction in the presence of from 0.5 to 5.0% by weight of an acidic polymerization catalyst and treating the product of polymerization with from 0.5 to 1.5 mols of isobutylene.

9. An oxidizable polymeric diene rubber composition which contains as an antioxidant in an antioxidant amount the resinous polymerization product of an allyl phenol having all positions ortho and para to the hydroxyl radical of the phenolic substituent filled with alkyl hydrocarbon radicals, at least one of said positions being filled with a tertiary hydrocarbon radical having at least 4 carbon atoms but not over 9 carbon atoms.

10. An oxidizable polymeric diene rubber composition which contains as an antioxidant in an antioxidant amount the resinous polymerization product of an allyl phenol having all positions ortho and para to the hydroxyl radical of the phenolic substituent filled with alkyl hydrocarbon radicals, at least one of said positions being filled with a tertiary hydrocarbon radical selected from the group consisting of tertiary butyl, tertiary amyl, tertiary hexyl, tertiary heptyl, tertiary octyl, and tertiary nonyl.

11. An oxidizable polymeric diene rubber composition which contains as an antioxidant in an antioxidant amount the polymerized product of

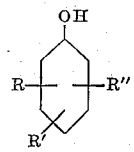

wherein R is a tertiary hydrocarbon radical having at least 4 carbon atoms but not over 9 carbon atoms, R' is an alkyl hydrocarbon radical having at least 1 but not over 3 carbon atoms, R" is selected from the group consisting of allyl and aliphatic hydrocarbon-substituted allyl radicals, one of the positions ortho and para to the hydroxyl radical being filled with R", one of the positions ortho and para to the hydroxyl being filled with R, the remaining ortho and para position being filled with a radical selected from the group consisting of R and R'.

12. An oxidizable polymeric diene rubber composition which contains as an antioxidant in an antioxidant amount the resinous polymerization product of 2-allyl-4-methyl-6-tertiarybutyl phenol.

References Cited in the file of this patent
UNITED STATES PATENTS

| | | |
|---|---|---|
| 1,940,727 | Moss et al. | Dec. 26, 1933 |
| 2,296,363 | Messer | Sept. 22, 1942 |
| 2,656,317 | Neff | Oct. 20, 1953 |
| 2,687,383 | D'Alelio | Aug. 24, 1954 |